United States Patent
Ohkubo

(10) Patent No.: US 7,623,433 B2
(45) Date of Patent: Nov. 24, 2009

(54) DOUBLE-DISK OPTICAL RECORDING MEDIUM

(75) Inventor: Shuichi Ohkubo, Tokyo (JP)

(73) Assignee: NEC Corporation, Tokyo (JP)

( * ) Notice: Subject to any disclaimer, the term of this patent is extended or adjusted under 35 U.S.C. 154(b) by 650 days.

(21) Appl. No.: 10/818,120

(22) Filed: Apr. 5, 2004

(65) Prior Publication Data
US 2004/0202085 A1 Oct. 14, 2004

(30) Foreign Application Priority Data

Apr. 8, 2003 (JP) ............................. 2003-103654
Feb. 16, 2004 (JP) ............................. 2004-037692

(51) Int. Cl.
*G11B 7/20* (2006.01)

(52) U.S. Cl. ..................... 369/94; 369/277; 369/286; 369/275.1

(58) Field of Classification Search ... 369/275.1–275.4, 369/94, 286, 277; 428/64.1, 64.4; 430/270.11, 430/270.13, 320, 321
See application file for complete search history.

(56) References Cited

U.S. PATENT DOCUMENTS

| | | | | |
|---|---|---|---|---|
| 5,905,700 | A * | 5/1999 | Best et al. ................. | 369/44.26 |
| 5,991,258 | A * | 11/1999 | Morita et al. ............. | 369/275.4 |
| 6,407,979 | B1 * | 6/2002 | Matsumoto et al. ...... | 369/275.4 |
| 6,456,584 | B1 | 9/2002 | Nagata | |
| 6,646,978 | B2 | 11/2003 | Okubo | |
| 6,700,862 | B2 | 3/2004 | Tsukuda | |
| 6,842,420 | B2 | 1/2005 | Tsukuda | |
| 7,068,590 | B2 | 6/2006 | Tsukuda | |
| 2001/0033543 | A1 | 10/2001 | Akiyama et al. | |
| 2002/0060979 | A1 * | 5/2002 | Tsukuda et al. .......... | 369/275.4 |
| 2003/0081510 | A1 * | 5/2003 | Murakami et al. ....... | 369/13.24 |

FOREIGN PATENT DOCUMENTS

| | | |
|---|---|---|
| CN | 1157048 A | 8/1997 |
| EP | 0 866 447 A2 | 9/1998 |
| EP | 866447 A2 * | 9/1998 |
| EP | 0 994 470 A2 | 4/2000 |
| EP | 1 291 854 A1 | 3/2003 |
| JP | 7-105569 | 4/1995 |

(Continued)

*Primary Examiner*—Joseph H Feild
*Assistant Examiner*—Henok G Heyi
(74) *Attorney, Agent, or Firm*—Scully, Scott, Murphy & Presser, P.C.

(57) ABSTRACT

An optical recording medium comprises a transparent lower disk and an upper disk secured together by a transparent intermediate member. On one side of the lower disk, groove tracks of width $W_{G0}$ and land tracks of width $W_{L0}$ are formed. All tracks of the lower disk are coated with a recording film on which a laser beam is incident from below and a reflecting film on the recording film for partially reflecting the laser beam. The upper disk is formed with land tracks of width $W_{L1}$ and groove tracks of width $W_{G1}$ for receiving light through the corresponding groove and land tracks of the lower disk. All tracks of the upper disk are also coated with laminated recording and reflecting films. The ratio $W_{G1}/W_{L1}$ of the upper disk is greater than unity and is equal to or greater than the ratio $W_{G0}/W_{L0}$ of the lower disk so that the carrier-to-noise ratios of the two disks are substantially equal to each other.

10 Claims, 5 Drawing Sheets

LASER BEAM

FOREIGN PATENT DOCUMENTS

| | | |
|---|---|---|
| JP | P2000-36130 A | 2/2000 |
| JP | P2000-76681 A | 3/2000 |
| JP | P2001-351270 A | 12/2001 |
| JP | P2002-92962 A | 3/2002 |
| JP | P2002-184032 A | 6/2002 |
| JP | P2003-16648 A | 1/2003 |
| WO | WO 96/31875 | 10/1996 |

* cited by examiner

LASER BEAM

| LOWER DISK | | | UPPER DISK | | |
|---|---|---|---|---|---|
| $W_{G0}/W_{L0}$ | C/N (LAND) | C/N (GROOVE) | $W_{G1}/W_{L1}$ | C/N (LAND) | C/N (GROOVE) |
| 0.8 | 57.0 | 53.0 | 0.9 | 59.0 | 51.0 |
| 0.9 | 55.5 | 54.5 | 1.0 | 58.5 | 53.0 |
| 1.0 | 55.0 | 55.0 | 1.1 | 57.0 | 55.5 |
| 1.1 | 54.5 | 56.0 | 1.2 | 56.0 | 56.0 |
| 1.2 | 53.0 | 57.0 | 1.3 | 55.5 | 57.0 |
| 1.3 | 51.0 | 59.0 | 1.4 | 53.0 | 58.0 |

DOUBLE-DISK OPTICAL RECORDING MEDIUM

BACKGROUND OF THE INVENTION

1. Field of the Invention

The present invention relates to optical recording mediums, and more specifically to a double-disk optical recording medium which maintains its position relative to the same laser source when data read/write operation is switched over between upper and lower recording layers.

2. Description of the Related Art

Japanese Patent Publication 2000-76681 discloses a servo tracking technique for recording high-density data. To achieve high density recording, data is recorded on land tracks as well as on groove tracks which alternate with the groove tracks. Japanese Patent Publication 2003-16648 discloses a high density recording technique using a multi-layered optical recording medium of the phase change type.

Also known in the art is a double-disk optical recording medium. As shown in FIG. 1, the known double-disk optical recording medium is constructed of a transparent lower disk $D_0$ and an upper disk $D_1$. A laser beam is directed to the lower disk from below, and on its opposite side, a plurality of groove tracks 3 of width $W_{G0}$ and land tracks 4 of width $W_{L0}$ are formed, each track being coated with a recording layer 4. Upper disk $D_1$ comprises a base member 5, whose lower side is formed with a plurality of groove tracks 6 of width $W_{G1}$ and land tracks 7 of width $W_{L1}$, each of the tracks 6 and 7 being coated with a recording layer 8.

As shown in FIG. 2, the lower recording layer 4 is comprised of a first dielectric film 4A initially formed on the transparent base member 1. On the dielectric film 4A is an optical recording film 4B on which a second dielectric film 4C and a reflecting film 4D are successively formed. With the information recording side of the base member 5 facing upwards, the upper recording layer 8 is fabricated. Initially, a reflecting film 8D is sputtered on the base member 5. On the reflecting film 8D is successively formed a dielectric film 8C on which an optical recording film 8B and a dielectric film 8D are successively formed. The upper disk is then turned upside down and cemented with the lower disk by means of an intermediate layer 9 so that the information-recording sides of the disks are facing each other and the groove tracks of each disk are respectively aligned with the land tracks of the other. In the prior art double-disk structure, the widths $W_{G0}$, $W_{L0}$, $W_{G1}$ and $W_{L1}$ are substantially equal to each other.

Data written on the lower disk is read by a laser beam which is focussed on the recording film 4B. This laser beam penetrates the recording film 4B and is partially reflected off the reflecting film 4D downwards to a photodiode, not shown. On the other hand, data written on the upper disk is read by using the same laser beam. In this case, the laser beam is directed through the lower disk to the upper disk. The reflecting film 4D of lower disk has such a thickness that partial energy of the incident beam passes through it and reaches the upper disk, where the beam is focused on the recording film 8B and reflected off the reflecting film 8D downwards through the lower disk to the photodiode.

If the light transmissivity of lower disk $D_0$ is denoted as $T_0$ and the light reflectivity of upper disk $D_1$ is indicated as $R_1$, the total reflectivity of the double-disk structure is given by $T_0^2 \times R_1$. In order to ensure sufficient optical energy for reading the upper disk, while ensuring sufficient energy for reading the lower disk, it is necessary that reflectivity $R_0$ is at least 0.5. Therefore, the thickness of reflecting film 4D is in the range between 10 nm and 20 nm. Since no limitations are imposed on the reflectivity of the upper disk, the thickness of the reflecting film 8D is in the range between 100 nm and 200 nm.

However, the carrier-to-noise ratio of data recorded on lower disks differs significantly from the carrier-to-noise ratio of data recorded on upper disks. It is undesirable for recording/playback apparatus for using a double-disk optical recording medium having different operating characteristics between its recording disks.

SUMMARY OF THE INVENTION

It is therefore an object of the present invention to provide a double-disk optical recording medium in which the operating characteristics of the two recording sides are substantially equal to each other.

The present invention is based on the inventor's discovery that the recording/playback characteristics of the lower and upper disks differ from each other due to the fabrication process in that the recording film of the lower disk is formed after one dielectric film is fabricated on a base member whose light transparency is important, while the recording film of the upper disk is formed after two films (a reflecting film and a dielectric film) are fabricated on a base member whose light transparency is unimportant at all.

The stated object is obtained by setting the ratio of groove-track width to land-track width on a first disk remote from a laser source is greater than unity and is equal to or greater than the ratio of groove-track width to land-track width of a second disk adjacent to the laser source.

According to a first aspect of the present invention, there is provided an optical recording medium comprising a first disk and a second disk secured together by means of an intermediate member of light transmissive material. The first disk comprises a base member formed, on its information-recording side, with a plurality of groove tracks of width $W_{G0}$ and land tracks of width $W_{L0}$ alternating with the groove tracks, each of the groove and land tracks being coated with an optical recording film for receiving a laser beam which is incident on the opposite side and a reflecting film for partially reflecting optical energy which penetrated the recording film. The second disk comprises a base member having an information-recording side facing the information recording side of the first base member. The information-recording side of the base member is formed with a plurality of land tracks of width $W_{L1}$ and groove tracks of width $W_{G1}$ alternating with the land tracks, each of the land and groove tracks of the second disk being coated with an optical recording film for receiving light from the corresponding groove and land tracks of the first disk and a reflecting film. In order to equate the carrier-to-noise ratios of the first and second disks, a ratio $W_{G1}/W_{L1}$ is greater than unity and is equal to or greater than a ratio $W_{G0}/W_{L0}$.

Preferably, $(W_{G1}/W_{L1})/(W_{G0}/W_{L0})$ is in the range between 1 inclusive and 1.5 inclusive. $W_{G1}/W_{L1}$ is in a range from 1.1 inclusive to 1.3 inclusive and $W_{G0}/W_{L0}$ is in the range between 0.9 inclusive and 1.1 inclusive.

According to a second aspect of the present invention, there is provided an optical recording/playback apparatus comprising an optical recording medium comprising a first disk and a second disk secured together by a transparent intermediate layer. The first disk comprises a base member of light transmissive material which is formed, on an information-recording side of the first disk, with a plurality of groove tracks of width $W_{G0}$ and land tracks of width $W_{L0}$ alternating with the groove tracks, each of the groove and land tracks being coated with an optical recording film for receiving a laser beam which is incident on the opposite of the disk and a reflecting film on the recording film for partially reflecting optical energy. The second disk comprises a base member which is formed, on an information-recording side of the second disk facing the information-recording side of the first disk, with a plurality of land tracks of width $W_{L1}$ and groove tracks of width $W_{G1}$ alternating with the land tracks, each of the land and groove tracks of the second disk being coated with an optical recording film for receiving light from the corresponding groove and land tracks of the first disk and a reflecting film on the recording film, wherein $W_{G1}/W_{L1}$ is greater than unity and is equal to or greater than a ratio $W_{G0}/W_{L0}$ so that carrier-to-noise ratios of the first and second disks are substantially equal to each other. An optical head assembly directs a laser beam onto the recording medium. Tracking and focusing control means is provided for controlling the optical head assembly so that the laser beam is incident on the groove- or land-tracks of the first disk and the land- or groove-tracks of the second disk.

BRIEF DESCRIPTION OF THE DRAWINGS

The present invention will be described in detail further with reference to the following drawings, in which.

DETAILED DESCRIPTION

Figure 3:
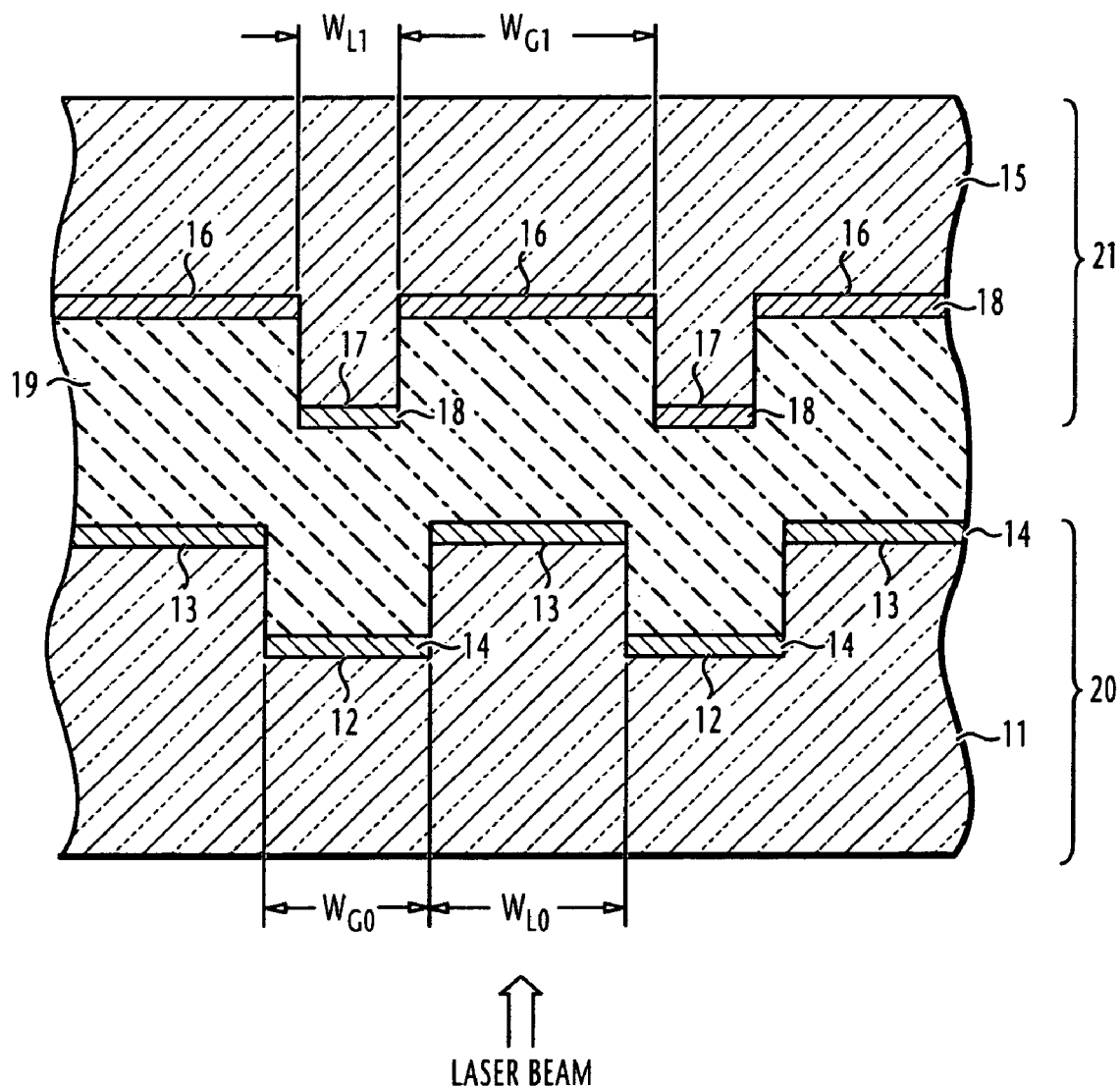
FIG. 3 is a cross-sectional view of a double-disk recording medium of the present invention for illustrating details of its upper and lower recording layers.

As illustrated in FIG. 3, the optical recording medium of the present invention is comprised of a lower disk 20 and an upper disk 21.

Lower disk 20 is constructed of a base member 11 such as polycarbonate or glass having on its information-recording (upper) side opposite to the light-receiving (lower) side formed with a set of groove tracks 12 of width $W_{G0}$ and a set of land tracks 13 of width $W_{L0}$, alternating with the groove tracks 12. At least one set of the grooves and lands is selected for recording signals on a lower recording layer 14.

Upper disk 21 is constructed of a base member 15 of any suitable material having on its information-recording (lower) side formed with a set of groove tracks 16 of width $W_{G1}$ and a set of land tracks 17 of width $W_{L1}$ alternating with the groove tracks 16. At least one set of these lands and grooves which corresponds to the selected set of the lower disk is used for recording signals on an upper recording layer 18. Therefore, if signals are recorded for the lower disk only on the groove tracks 12, the land tracks 17 are used for the upper disk for recording signals.

Lower and upper disks 20 and 21 are cemented together by transparent intermediate layer 19 such as UV-sensitive thermosetting material. Preferably, the intermediate layer 19 has a thickness in a range from 15 μm to 40 μm.

As described below, by setting the ratio $W_{G1}/W_{L1}$ greater than unity and equal to or greater than the ratio $W_{G0}/W_{L0}$, the recording/playback characteristics of both recording disks 20 and 21 are rendered substantially equal to each other.

Figure 1:
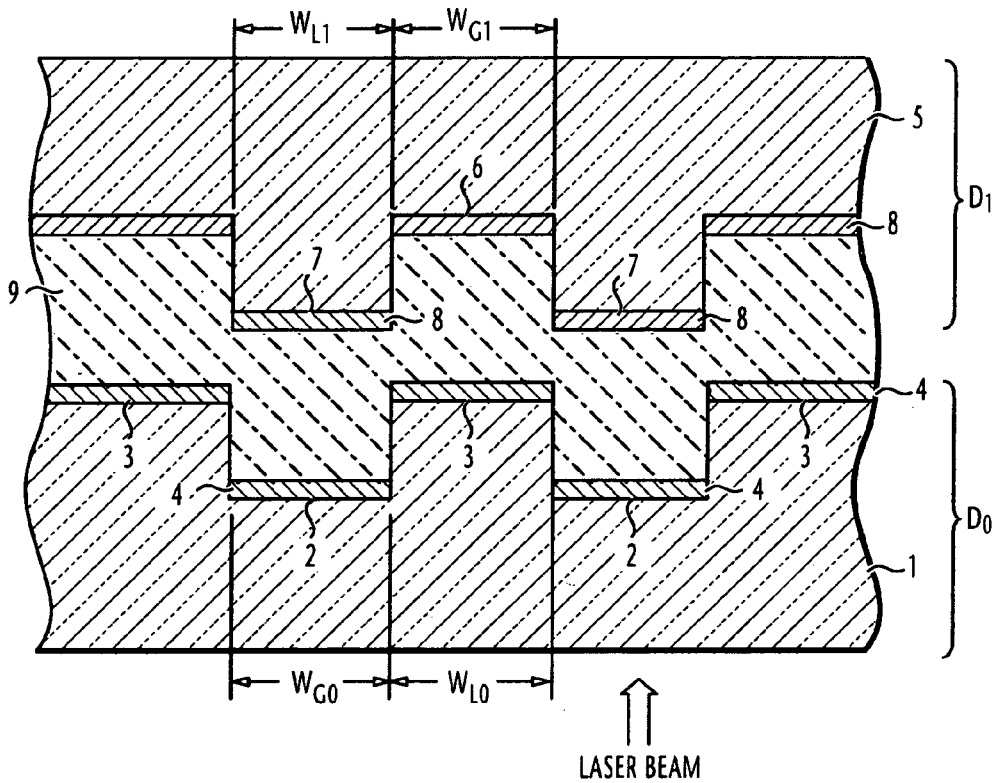
FIG. 1 is a cross-sectional view of a prior art optical recording medium of double-disk structure.
Figure 2:
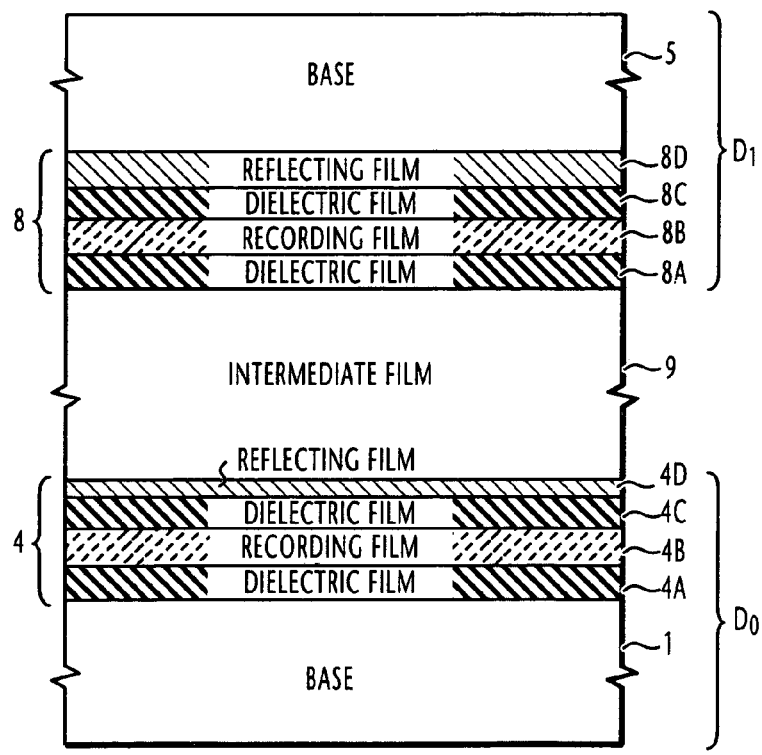
FIG. 2 is a cross-sectional view of the prior art double-disk recording medium for illustrating details of its upper and lower recording layers.

The recording layers 14 and 18 of both disks are constructed in a laminated structure identical to that shown in FIG. 2 by using the sputtering technique. More specifically, the dielectric films 4A and 4C may be formed of SiN, $SiO_2$, $TaO_x$, $Al_2O_3$, AlN, or ZnS—$SiO_2$ or a combination of these. Recording film 4B may be formed of a phase change recording material, such as GeSbTe or AgInSbTe, in which data is written by illuminating a spot with a laser beam that causes a change between amorphous and crystalline states and the data is read by the difference in reflected light from amorphous and crystalline spots. Alternatively, the recording film 4B may be formed of a magneto-optical material such as TbFeCo. Suitable materials for the reflecting film 4D include metals such as Ag, Au, Cu, Al and Ti, and its thickness is approximately 10 nm to guarantee a predetermined amount of light transmissivity as well as reflectivity. The same materials can be used for the upper disk 21 as those of lower disk 20. Similar to the prior art, the thickness of the reflecting film 8D is in the range between 100 nm and 200 nm since no transmissivity is required.

EXAMPLE 1

A number of double-disk optical recording samples of different ratios of groove-to-land width were produced, using polycarbonate disks of 0.6-mm thick as lower and upper base members 11 and 15. In each sample, the lower disk is comprised of PC (polycarbonate)/ZnS—$SiO_2$/GeSbTe/ZnS—$SiO_2$/Ag and the upper disk is comprised of PC/Ag/ZnS—$SiO_2$/GeSbTe/ZnS—$SiO_2$. UV-sensitive thermosetting layer of 20 μm was used for cementing the lower and upper disks. A depth of 0.7 μm and a pitch of 43 nm were chosen to create the groove tracks on all disks. Each sample was subjected to a laser beam of wavelength in a range 390 nm to 430 nm (preferably, 405 nm) focused by a lens of numerical aperture (NA) 0.65 and data was recorded on both sets of groove and land tracks. Each sample was rotated at a linear velocity of 5.6 m/s and an 8.25-MHz signal, which is ⅛ of clock frequency 66 MHz, was used for recording the data. The recorded data of all samples were read from each disk and the carrier-to-noise ratio (dB) were respectively measured on groove and land tracks, as indicated in FIG. 4.

Figures 4, 5:
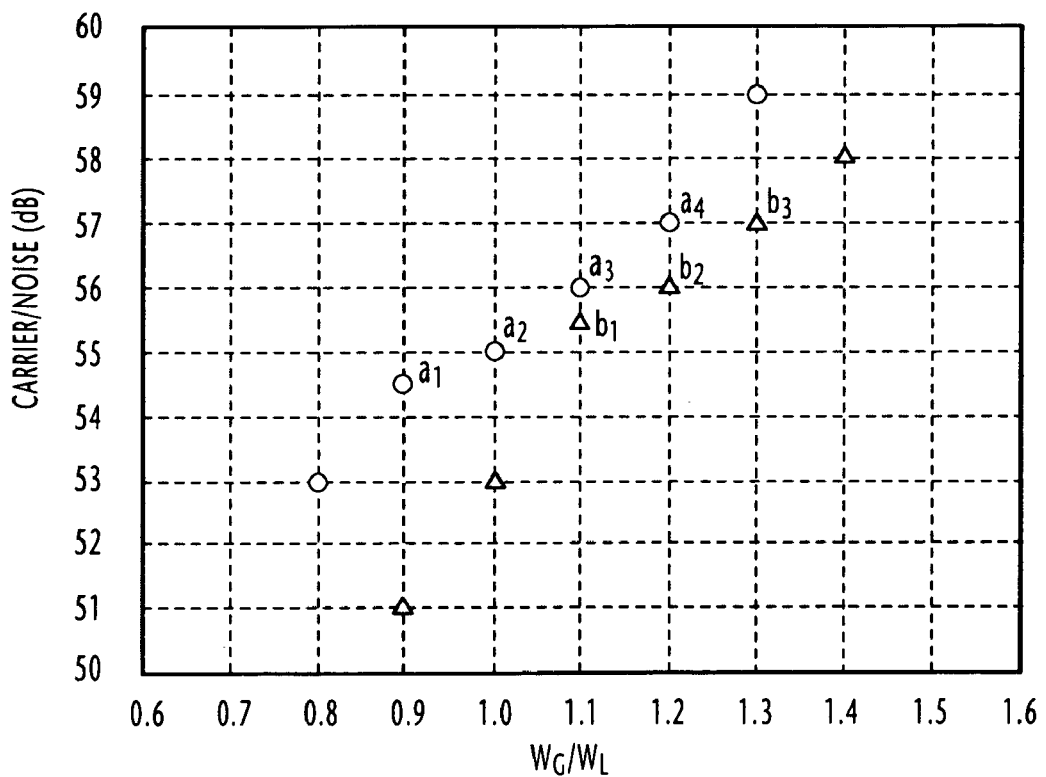
FIG. 4 is a table of carrier-to-noise ratios for different values of groove-to-land width ratios obtained from a number of upper and lower recording disks of the present invention when recording is made on all tracks by fabricating a number of sample recording mediums according to a first example of the present invention.
FIG. 5 is a graphic representation of carrier-to-noise ratios of groove tracks of lower sample disks and those of land tracks of upper sample disks plotted against groove-to-land width ratios obtained from the table of FIG. 4.

As illustrated in FIG. 4, the lower disks of six samples had groove-to-land ratios of 0.8, 0.9, 1.0, 1.1, 1.2 and 1.3, respectively, and their upper disks had groove-to-land ratios of 0.9, 1.0, 1.1, 1.2, 1.3 and 1.4, respectively.

It is desirable that the carrier-to-noise ratios of lower and upper disks are equal to each other. However, in a practical aspect, a C/N difference of 2.0 dB is permissible between the two disks. As indicated by thick lines in FIG. 4, the carrier-to-noise ratios of lower and upper disks can be made substantially equal to each other by choosing a groove-to-land ratio $W_{G0}/W_{L0}$ for the lower disk so that $0.9 \leq W_{G0}/W_{L0} \leq 1.1$ holds and choosing a groove-to-land ratio $W_{G1}/W_{L1}$ for the upper disk so that $1.1 \leq W_{G1}/W_{L1} \leq 1.3$ holds. Assume that data is recorded only on the groove tracks on a lower disk and only on the land tracks on an upper disk. If a $W_{G0}/W_{L0}$ value of 0.9 is chosen for the lower disk, the best $W_{G1}/W_{L1}$ value for the upper disk is 1.1. It is seen that in any groove-land combination, the ratio $W_{G1}/W_{L1}$ is greater than unity and equal to greater than the ratio $W_{G0}/W_{L0}$.

In FIG. 5, the carrier-to-noise ratios of groove tracks of lower sample disks of FIG. 4 are plotted as solid dots and those of groove tracks of upper sample disks are plotted as triangles against groove-to-land width ratios of both lower and upper sample disks. It is seen that $W_G/W_L$ ratios marked by symbols $a_1$, $a_2$ and $a_3$ can be chosen for a lower disk corresponding to $W_G/W_L$ ratios marked by symbols $b_1$, $b_2$ and $b_3$, respectively, of an upper disk.

EXAMPLE 2

Similar to Example 1, a number of double-disk optical recording samples of different ratios of groove-to-land width were produced, with the exception that a depth of 0.4 μm and a pitch of 30 nm were chosen to create the groove tracks. Each sample was subjected to the same laser beam as used in Example 1 and rotated at the linear velocity of 5.6 m/s and an 8.25-MHz signal was used for recording data. The data was recorded on both sets of groove and land tracks of both lower and upper disk samples. The recorded data of these samples were read from the groove tracks of both lower and upper disk samples and their carrier-to-noise ratio were plotted in a graph as shown in FIG. 6.

Figure 6:
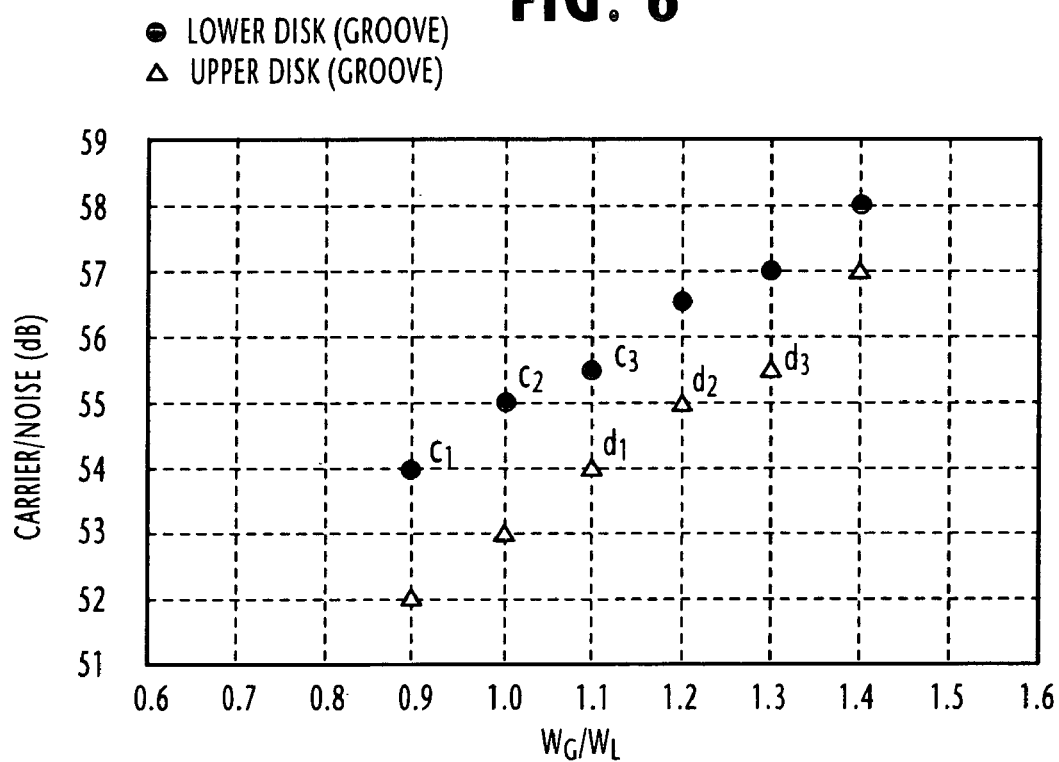
FIG. 6 is a graphic representation of carrier-to-noise ratios of groove tracks of lower sample disks and those of land tracks of upper sample disks plotted against groove-to-land width ratios obtained from sample mediums fabricated according to a second example of the present invention.

As indicated in FIG. 6, the carrier-to-noise ratios of lower and upper disks can be made substantially equal to each other if the lower disk satisfies the relation $0.9 \leq W_{G0}/W_{L0} \leq 1.1$ and the upper disk satisfies the relation $1.1 \leq W_{G1}/W_{L1} < 1.3$. If $W_{G0}/W_{L0}=0.9$ is chosen for the lower disk, $W_{G1}/W_{L1}=1.1$ is the best choice for the upper disk. It is seen that for a lower disk $W_G/W_L$ ratios marked by symbols $c_1$, $c_2$ and $c_3$ can be chosen respectively corresponding to $W_G/W_L$ ratios of an upper disk marked by symbols $d_1$, $d_2$ and $d_3$. In addition, the carrier-to-noise ratios of the lower and upper disks are substantially equal to one another when $W_{G1}/W_{L1}$ is approximately 1.2 times greater than $W_{G0}/W_{L0}$. If $R=(W_{G1}/W_{L1})/(W_{G0}/W_{L0})$, it is preferable that $R>1$. Since the lower limit of the usable range of ratios $W_{G0}/W_{L0}$ is 0.9 and the upper limit of the usable range of ratios $W_{G1}/W_{L1}$ is 1.3, a relation $1<R<1.5$ holds. It is preferable that R is equal to 1.2.

EXAMPLE 3

Figure 7:
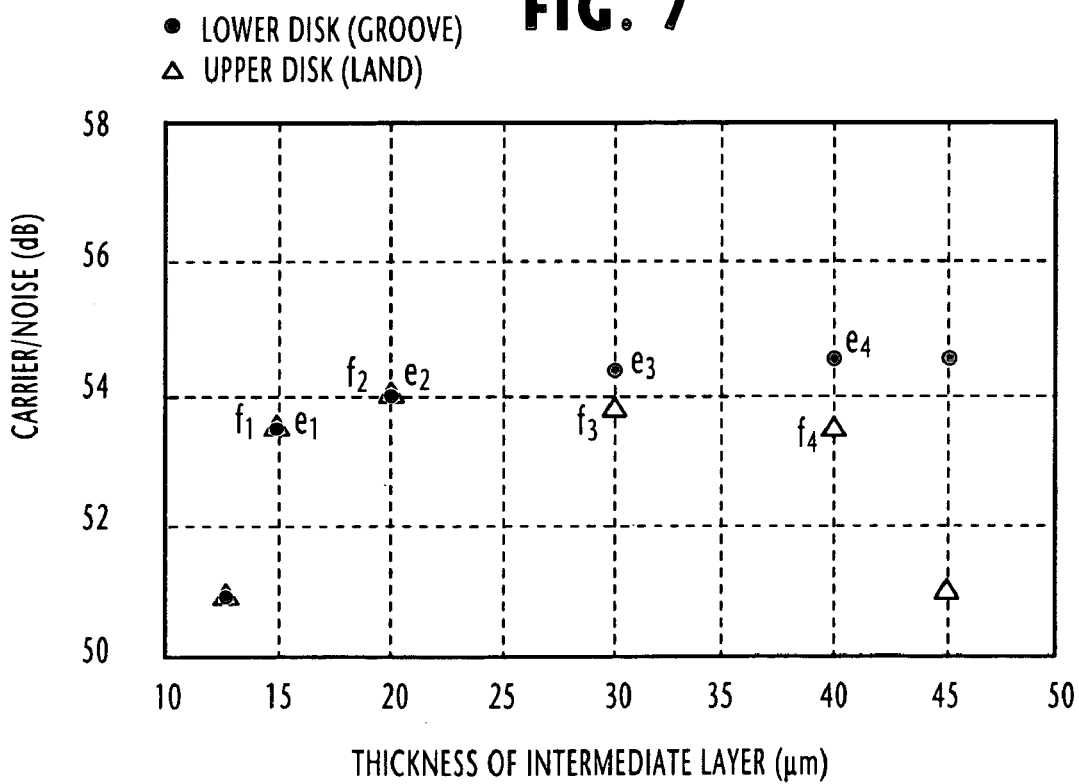
FIG. 7 is a graphic representation of carrier-to-noise ratios of groove tracks of lower sample disks and those of land tracks of upper sample disks plotted against thickness values of intermediate layers.

Similar to Example 2, a number of double-disk optical recording samples were produced, with the exception that each sample had a $W_{G0}/W_{L0}$ ratio of 0.9 and a $W_{G1}/W_{L1}$ ratio of 1.1 and its lower and upper disks were secured together by an intermediate layer of different thickness. Using a laser beam of the same wavelength and rotating each disk sample at the same linear velocity for recording data at the same frequency as in the case of the previous Examples, carrier-to-noise ratios of groove tracks of lower disk samples and land tracks of upper disk samples were measured and plotted against thickness values of their intermediate layers, as shown in FIG. 7. It is seen that a preferred thickness value for the intermediate layer ranges from 15 μm to 40 μm as indicated by symbols $e_1$ to $e_4$ (lower disk) and symbols $f_1$ to $f_4$ (upper disk).

Figure 8:
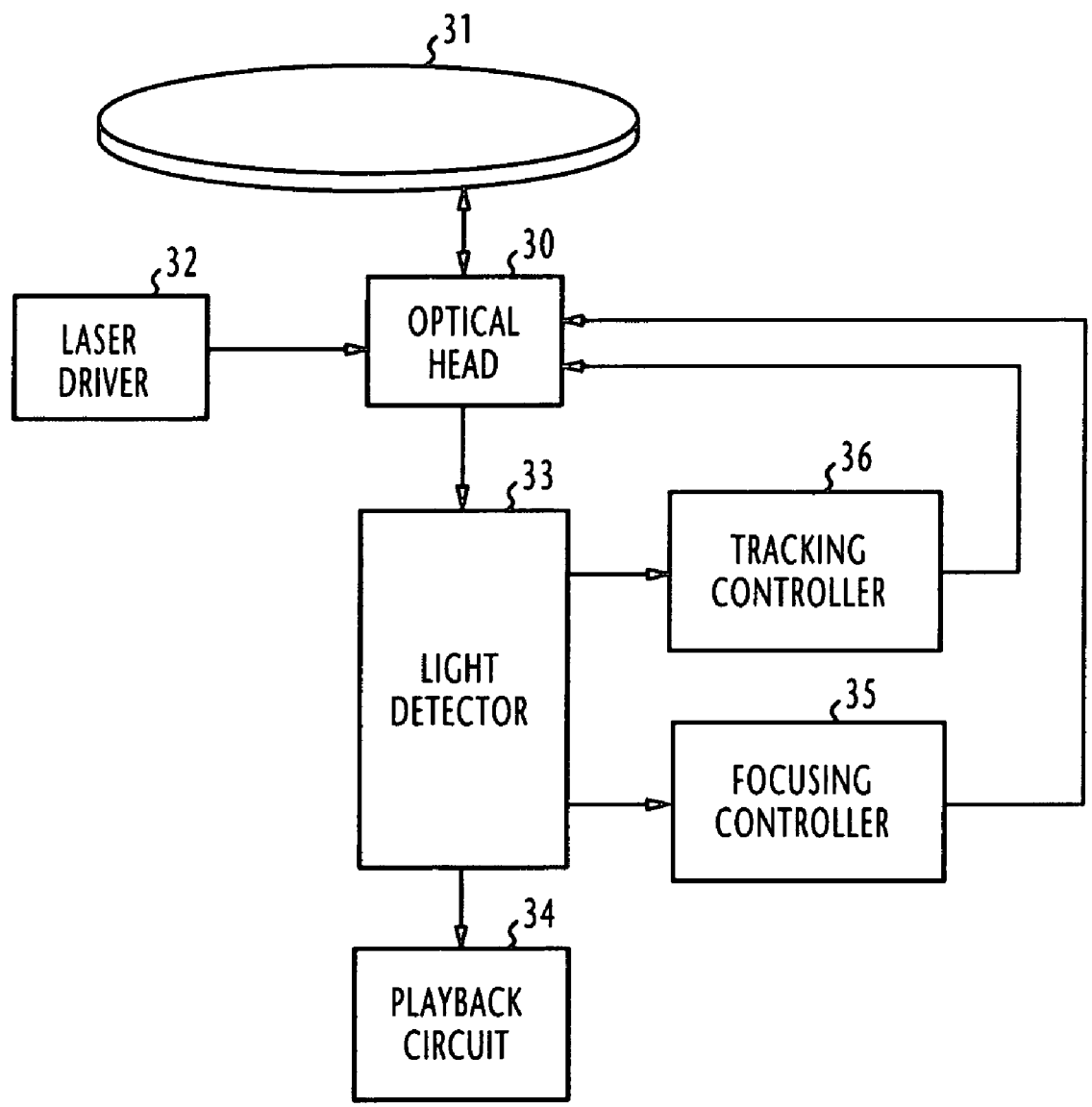
FIG. 8 is a block diagram of an optical recording/playback system for operating the double-disk optical recording medium of the present invention.

FIG. 8 shows an optical recording/playback apparatus. The apparatus may be of a non-portable type in which the optical recording medium of the present invention is removably mounted. The apparatus may be of a compact portable type in which the optical recording medium is fixedly mounted. The apparatus comprises an optical head assembly 30 which includes a semiconductor laser for directing a laser beam to an optical recording medium 31 of the present invention and collecting reflecting rays. A laser driver 32 is connected to the head assembly 30 for modulating the directed laser beam with an information signal to be recorded. The reflected light is converted to an electrical signal by a light detector 33 and supplied to a playback circuit 34. A focusing controller 35 is connected to the light detector 33 for focusing the laser beam on the right track. When the system switches from one disk to the other, the focusing controller 35 supplies a switching signal to the optical head 30 so that the laser beam is brought to a focus onto the target disk. A tracking controller 36 is connected to the light detector 33 for controlling the optical head 30 with a tracking control signal in a push-pull mode, for example, so that the laser beam is always kept on the right track.

In one embodiment, the focusing controller 35 and the tracking controller 36 control the optical head assembly 30 so that the laser beam is incident on the groove- and land-tracks of the lower disk and on the land- and groove-tracks of the upper disk. In another embodiment, the focusing controller 35 and the tracking controller 36 control the optical head assembly 30 so that the laser beam is incident on the groove tracks of the lower disk and on the land tracks of the upper disk. In a further embodiment, the focusing controller 35 and the tracking controller 36 control the optical head assembly 30 so that the laser beam is incident on the land tracks of the lower disk and on the groove tracks of the upper disk.

What is claimed is:

1. An optical recording medium comprising:
    a first disk comprising a base member of light transmissive material which is formed, on an information-recording side of the first disk, with a plurality of groove tracks of width $W_{G0}$ and land tracks of width $W_{L0}$ alternating with said groove tracks, each of said groove and land tracks being coated with a first optical recording film for receiving a laser beam which is incident on the opposite of the first disk and a reflecting film on the first optical recording film for partially reflecting optical energy;
    a second disk comprising a base member which is formed, on an information-recording side of the second disk facing the information-recording side of the first disk, with a plurality of land tracks of width $W_{L1}$ and groove tracks of width $W_{G1}$ alternating with the land tracks, said land tracks of the second disk corresponding in position to said groove tracks of the first disk and said groove tracks of the second disk corresponding in position to said land tracks of the first disk, each of said land and groove tracks of the second disk being coated with a second optical recording film for receiving light from the corresponding groove and land tracks of the first disk and a reflecting film on the recording film, the first optical recording film of the first disk being closer in distance to the laser beam than the second optical recording film of the second disk; and
    an intermediate member of light transmissive material disposed between said first and second optical recording films, wherein a ratio of $W_{G1}/W_{L1}$ is substantially greater than unity and is greater than a ratio $W_{G0}/W_{L0}$ so that carrier-to-noise ratios of said first and second disks are substantially equal to each other.

2. The optical recording medium of claim 1, wherein $(W_{G1}/W_{L1})(W_{G0}/W_{L0})$ is substantially greater than 1 and smaller than 1.5 inclusive.

3. The optical recording medium of claim 2, wherein the ratio $W_{G1}/W_{L1}$ is in a range from 1.1 to 1.3 inclusive and the ratio $W_{G0}/W_{L0}$ is in the range between 0.9 and 1.1 inclusive.

4. The optical recording medium of any of claims 1 to 3, wherein said intermediate member has a thickness in the range between 15 μm to 40 μm inclusive.

5. The optical recording medium of claim 1, wherein each base member of said first and second disks has a thickness in the range between 0.4 mm and 1.0 mm inclusive, and said laser beam has a wavelength approximately 405 nanometers.

6. The optical recording medium of claim 1, wherein said first and second disks are rigidly integrated together by said intermediate member.

7. An optical recording/playback apparatus comprising:
   an optical recording medium comprising:
      a first disk comprising a base member of light transmissive material which is formed, on an information-recording side of the first disk, with a plurality of groove tracks of width $W_{G0}$ and land tracks of width $W_{L0}$ alternating with said groove tracks, each of said groove and land tracks being coated with a first optical recording film for receiving a laser beam which is incident on the opposite of the first disk and a reflecting film on the first optical recording film for partially reflecting optical energy,
      a second disk comprising a base member which is formed, on an information-recording side of the second disk facing the information-recording side of the first disk, with a plurality of land tracks of width $W_{L1}$ and groove tracks of width $W_{G1}$ alternating with the land tracks, said land tracks of the second disk corresponding in position to said groove tracks of the first disk and said groove tracks of the second disk corresponding in position to said land tracks of the first disk, each of said land and groove tracks of the second disk being coated with a second optical recording film for receiving light from the corresponding groove and land tracks of the first disk and a reflecting film on the recording film, wherein $W_{G1}/W_{L1}$ is substantially greater than unity and is greater than a ratio $W_{G0}/W_{L0}$ so that carrier-to-noise ratios of said first and second disks are substantially equal to each other, and
      an intermediate member of light transmissive material disposed between said first and second optical recording films,
   an optical head assembly for directing a laser beam onto said recording medium; a light detector for detecting light from said recording medium; and
   tracking and focusing control means connected to said light detector for controlling said optical head assembly so that said laser beam is incident on at least one of said groove tracks and land tracks of said first disk and at least one of said land tracks and groove tracks of said second disk.

8. The optical recording/playback apparatus of claim 7, wherein said tracking and focusing control means is arranged to control said optical head assembly so that said laser beam is incident on said groove tracks of said first disk and said land tracks of said second disk.

9. The optical recording/playback apparatus of claim 7, wherein said tracking and focusing control means is arranged to control said optical head assembly so that said laser beam is incident on said land tracks of said first disk and said groove tracks of said second disk.

10. The optical recording/playback apparatus of any of claims 7 to 9, wherein said laser beam has a wavelength ranging from 390 nm to 430 nm.

* * * * *